United States Patent
Woo et al.

(10) Patent No.: US 12,428,891 B2
(45) Date of Patent: Sep. 30, 2025

(54) BIDIRECTIONALLY OPENABLE CONSOLE

(71) Applicants:HYUNDAI MOTOR COMPANY, Seoul (KR); KIA CORPORATION, Seoul (KR); DAYOU EP CO., LTD., Busan (KR)

(72) Inventors: Jung Hoon Woo, Suwon-si (KR); Dae Hee Lee, Incheon (KR); Hong Sik Chang, Hwaseong-si (KR); Hye Kyung Kim, Suwon-si (KR); Kwan Woo Lee, Suwon-si (KR); Sang Jin Joung, Ulsan (KR); Kyoung Sik Kim, Suwon-si (KR); Seol Wan Park, Seoul (KR); Nam Su Park, Suwon-si (KR); Hong Kil Noh, Asan-si (KR)

(73) Assignees: HYUNDAI MOTOR COMPANY, Seoul (KR); KIA CORPORATION, Seoul (KR); DAYOU EP CO., LTD., Busan (KR)

( * ) Notice: Subject to any disclaimer, the term of this patent is extended or adjusted under 35 U.S.C. 154(b) by 215 days.

(21) Appl. No.: 18/371,721

(22) Filed: Sep. 22, 2023

(65) Prior Publication Data
US 2024/0344378 A1 Oct. 17, 2024

(30) Foreign Application Priority Data

Apr. 17, 2023 (KR) ........................ 10-2023-0049834

(51) Int. Cl.
*E05D 15/00* (2006.01)
*B60R 7/04* (2006.01)
(Continued)

(52) U.S. Cl.
CPC .............. *E05D 15/502* (2013.01); *B60R 7/04* (2013.01); *E05B 83/32* (2013.01); *B60R 2011/0007* (2013.01); *E05Y 2900/538* (2013.01)

(58) Field of Classification Search
CPC E05D 15/502; E05D 3/02; E05D 7/02; E05D 5/0207; E05D 11/082; B60R 7/04;
(Continued)

(56) References Cited

U.S. PATENT DOCUMENTS

| 6,733,096 B2 | 5/2004 | Bae |
| 2003/0209956 A1 | 11/2003 | Bae |
| 2023/0294610 A1* | 9/2023 | Kim .......................... B60R 7/04 |
| | | 296/24.34 |

FOREIGN PATENT DOCUMENTS

| JP | 2018012454 A | * | 1/2018 | .......... E05D 15/502 |
| JP | 2019077404 A | * | 5/2019 | .............. B60R 7/04 |

(Continued)

*Primary Examiner* — Janet M Wilkens
(74) *Attorney, Agent, or Firm* — Lempia Summerfield Katz LLC

(57) ABSTRACT

A bidirectionally openable console includes side lid portions, a center lid portion positioned between the side lid portions, a first button unit positioned at a front end of the center lid portion, a second button unit positioned at a rear end of the center lid portion, and rotary units configured to be respectively rotated by movement of the first and second button units. The console further includes: fastening units, each of which is constructed such that, when an opening request input is applied to a corresponding button unit, a corresponding rotary unit is rotated to retract a central shaft portion into the center lid portion; hinge units, each of which is rotated together with the center lid portion when the center lid portion is opened, and locking units, each of which restricts movement of the fastening unit when the center lid portion is closed.

15 Claims, 13 Drawing Sheets

(51) Int. Cl.
 *E05B 83/32* (2014.01)
 *E05D 15/50* (2006.01)
 *B60R 11/00* (2006.01)

(58) Field of Classification Search
 CPC ..... B60R 7/06; B60R 2011/007; E05B 83/32; E05B 85/00; E05B 85/24; E05Y 2900/538; B60N 3/00; B60N 3/004; B60N 3/002; B60N 2/793; B64D 11/0638; B64D 11/0015; B64D 11/00152; B64D 11/0624; B64D 11/0605; B64D 11/0646; A47B 81/002; A47B 2003/145; A47B 23/044; A47B 83/02; A47B 3/0818; A47B 3/002; A47B 3/082; B61D 37/00; A47C 7/70
 USPC ........ 312/324, 235.6; 296/37.8, 24.34, 1.09; 297/188.21, 157.1, 158.2, 158.4, 162, 297/163, 173, 188.2, 164, 17, 411.32, 297/411.21, 411.3; 108/25, 44, 42
 See application file for complete search history.

(56) References Cited

FOREIGN PATENT DOCUMENTS

| KR | 19980037897 U | * | 9/1998 | ............. E05B 83/32 |
|---|---|---|---|---|
| KR | 100202465 B1 | * | 6/1999 | ........... E05D 15/502 |
| KR | 20030086806 A | | 11/2003 | |
| KR | 20040021034 A | | 3/2004 | |
| KR | 100930757 B1 | * | 12/2009 | ............. E05B 83/32 |
| KR | 102616518 B1 | * | 12/2023 | ............. B60N 2/793 |
| KR | 20240139956 A | * | 9/2024 | ............. B60N 2/793 |

\* cited by examiner

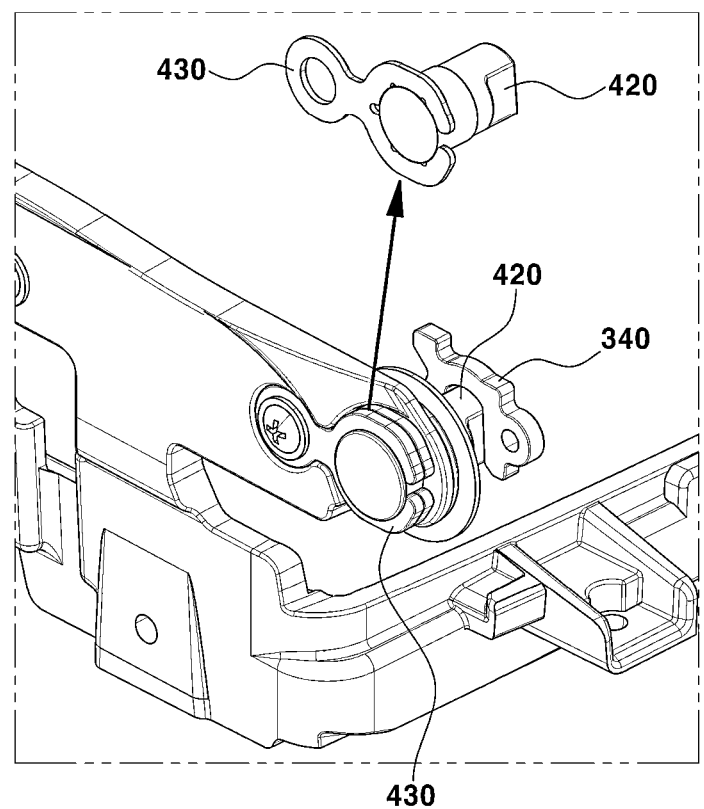

BIDIRECTIONALLY OPENABLE CONSOLE

CROSS-REFERENCE TO RELATED APPLICATION

This application claims under 35 U.S.C. § 119 (a) the benefit of priority to Korean Patent Application No. 10-2023-0049834, filed on Apr. 17, 2023, the entire contents of which are incorporated herein by reference.

BACKGROUND

(a) Technical Field

The present disclosure relates to a bidirectionally openable console. More particularly, it relates to a bidirectionally openable console capable of being opened about any one of two ends of a center lid portion.

(b) Background Art

Typically, a console box is provided between a driver seat and a passenger seat of a vehicle in order to temporarily store goods therein, and an armrest is provided at the upper portion of the console box so as to serve as a cover and to allow an arm of a driver or a passenger seated in the seat to be conveniently mounted thereon.

Particularly, the armrest is a critical component because the armrest allows a driver who performs long-term driving to perform gear shifting or the like while the arm of the driver is mounted on the armrest in order to alleviate fatigue of the driver.

The armrest is provided therein with a console. The armrest may include a simple armrest, which is configured to cover only a portion of a shift lever or a parking brake lever provided in a tunnel portion of the floor panel between a driver seat and a passenger seat, and a large-sized armrest, which constitutes a portion of an instrument panel to allow switches, a radio, a stereo unit, a heater control, a pocket for receiving small goods, and the like to be disposed thereon, and which is provided at the rear side thereof with a box, which includes a cover having a pad and on which an ashtray for rear seats or switches are mounted.

Recently, an open-type armrest has been suggested in order to assure various uses of a console. Accordingly, research to use the console space in an open-type armrest as a storage space is actively conducted.

It is preferable to allow both a front passenger and a rear passenger to access a console space. However, because a console configured to be openable in one direction allows a driver or passenger to access thereto only from one side, it is inconvenient for a driver or passenger at the other side to access the same.

The above information disclosed in this Background section is only for enhancement of understanding of the background of the present disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art. An object of the present disclosure is to provide a console including a center lid portion capable of being openable in any one direction of forward and backward.

Furthermore, another object of the present disclosure is to provide a console in which a center lid portion includes a hinge structure capable of strongly supporting the center lid portion when one end of the center lid portion is rotated and opened about the other end.

The objects of the present disclosure are not limited to the above-mentioned objects, and other objects of the present disclosure, which are not mentioned above, should be clearly understood from the following descriptions of embodiments and should be apparent from the embodiments of the present disclosure. The above objects and other objects of the present disclosure are achieved by the means and combinations thereof disclosed in the claims.

The present disclosure provides a bidirectionally openable console including side lid portions positioned at two lateral sides of the console, and a center lid portion positioned between the side lid portions and capable of being opened about any one of two ends thereof. The bidirectionally openable console further includes: a first button unit positioned at a front end of the center lid portion, a second button unit positioned at a rear end of the center lid portion, rotary units that are positioned at the center lid portion and respectively rotated in response to opening request inputs applied to the first and second button units. The bidirectionally openable console further includes: fastening units positioned at two ends of the center lid portion. In particular, each of the fastening units is constructed such that, when an opening request input is applied to a corresponding one of the first and second button units, a corresponding one of the rotary units is rotated so as to retract a central shaft portion of the fastening unit, which projects into the side lid portion, into the center lid portion. The bidirectionally openable console further includes: hinge units, each of which surrounds a corresponding one of the central shaft portions and is rotated together with the center lid portion when the center lid portion is opened. The bidirectionally openable console further includes: locking units positioned close to the fastening units of the center lid portion, each of the locking units being brought into contact with the side lid portion at at least a portion thereof and being configured to restrict movement of the fastening unit when the center lid portion is closed.

In an embodiment, each of the fastening units may include a fastening housing configured to be movable toward the side lid portion together with the central shaft portion, a fastening holder configured to be movable together with the fastening housing and positioned close to the locking unit, and a fastening guide configured to surround a portion of the center lid portion through which the central shaft portion projects.

In another embodiment, each of the hinge units may include a hole portion, which is positioned at the side lid portion and into which the central shaft portion is inserted, and a hinge nut defining the hole portion. In particular, the hinge nut is engaged with the fastening guide and may be rotated together with the center lid portion. Each of the hinge units may include a frictional guide provided at a location at which the hinge nut faces the side lid portion. The frictional guide may provide the hinge nut with frictional force when the hinge nut is rotated, wherein the hinge nut may be inserted into the fastening guide so as to be coupled thereto in a surface-to-surface fashion.

In still another embodiment, each of the locking units may include a locking rod configured to project at a portion thereof from the center lid portion so as to be in contact with the side lid portion, and a locking protrusion, which is provided at the locking rod and is engaged with the fastening holder.

In yet another embodiment, when the center lid portion is closed, a portion of the locking rod may be in contact with the side lid portion, and the locking protrusion and the fastening holder may be maintained in the state of being space apart from each other. When the center lid portion is open, the fastening holder may be moved inwards beyond the locking protrusion and may be engaged with the locking protrusion.

In still yet another embodiment, the locking protrusion may be sloped at a region thereof that faces the fastening holder.

In a further embodiment, the first button unit may include a first button portion, which is positioned at the front end of the center lid portion and is capable of being inserted into the center lid portion in a length direction of the center lid portion, a first rotating portion, which is in contact with an inner side of the first button portion and is rotated in a vertical direction by movement of the first button portion in the length direction, and a first button rod configured to be moved to a location close to the second button unit in the length direction of the center lid portion by rotation of the first rotating portion.

In another embodiment, the second button unit may include a second button portion, which is positioned at the rear end of the center lid portion and is capable of providing force in the length direction of the center lid portion, a second rotating portion, which is in contact with the second button portion and is rotated by movement of the second button portion, and a second button rod configured to be moved to a location close to the first rotating portion in the length direction of the center lid portion by rotation of the second rotating portion so as to restrict rotation of the first rotating portion.

In still another embodiment, when a pressure equal to or higher than a predetermined pressure is applied to the first button portion, one end of the first rotating portion may be inserted into the first button rod and may be held thereby In still another aspect, the present disclosure provides a bidirectionally openable console including side lid portions positioned at two lateral sides of the console, a center lid portion positioned between the side lid portions and capable of being opened about any one of two ends thereof, a first button unit positioned at a front end of the center lid portion, a second button unit positioned at a rear end of the center lid portion, fastening units positioned at two ends of the center lid portion, each of the fastening units being constructed such that, when an opening request input is applied to a corresponding one of the first and second button units, a central shaft portion of the fastening unit, which projects into the side lid portion, is retracted into the center lid portion, hinge units, each of which surrounds a corresponding one of the central shaft portions and is rotated together with the center lid portion when the center lid portion is opened, and locking units positioned close to the fastening units of the center lid portion, each of the locking units being brought into contact with the side lid portion at a portion thereof and being configured to restrict movement of the fastening unit when the center lid portion is closed.

In an embodiment, the bidirectionally openable console may further include rotary units, which are positioned at the center lid portion and are respectively rotated so as to move the fastening units in a width direction in response to opening request inputs applied to the first and second button units In another embodiment, each of the fastening units may include a fastening housing configured to be movable toward the side lid portion together with the central shaft portion, a fastening holder configured to be movable together with the fastening housing and positioned close to the locking unit, and a fastening guide configured to surround a portion of the center lid portion through which the central shaft portion projects.

In still another embodiment, each of the hinge units may include a hole portion, which is positioned at the side lid portion and into which the central shaft portion is inserted, the hole portion being rotated together with the central shaft portion, a hinge nut defining the hole portion, the hinge nut being engaged with the fastening guide and being rotated together with the center lid portion, and a frictional guide provided at a location at which the hinge nut faces the side lid portion, the frictional guide being configured to provide the hinge nut with frictional force when the hinge nut is rotated, wherein the hinge nut may be inserted into the fastening guide so as to be coupled thereto in a surface-to-surface fashion.

In yet another embodiment, each of the locking units may include a locking rod configured to project at a portion thereof from the center lid portion so as to be in contact with the side lid portion, and a locking protrusion, which is provided at an inner side of the locking rod and is engaged with the fastening holder.

In still yet another embodiment, when the center lid portion is closed, a portion of the locking rod may be in contact with the side lid portion and the locking protrusion and the fastening holder may be maintained in the state of being space apart from each other, and, when the center lid portion is open, the fastening holder may be moved inwards beyond the locking protrusion and may be engaged with the locking protrusion.

BRIEF DESCRIPTION OF THE DRAWINGS

The above and other features of the present disclosure are now described in detail with reference to certain embodiments thereof, illustrated in the accompanying drawings which are given hereinbelow by way of illustration only, and thus are not limitative of the present disclosure, and wherein:

FIG. 5C illustrates the assembled state of a hinge unit into which the central shaft portion is inserted, according to an embodiment of the present disclosure;

Figure 1A:
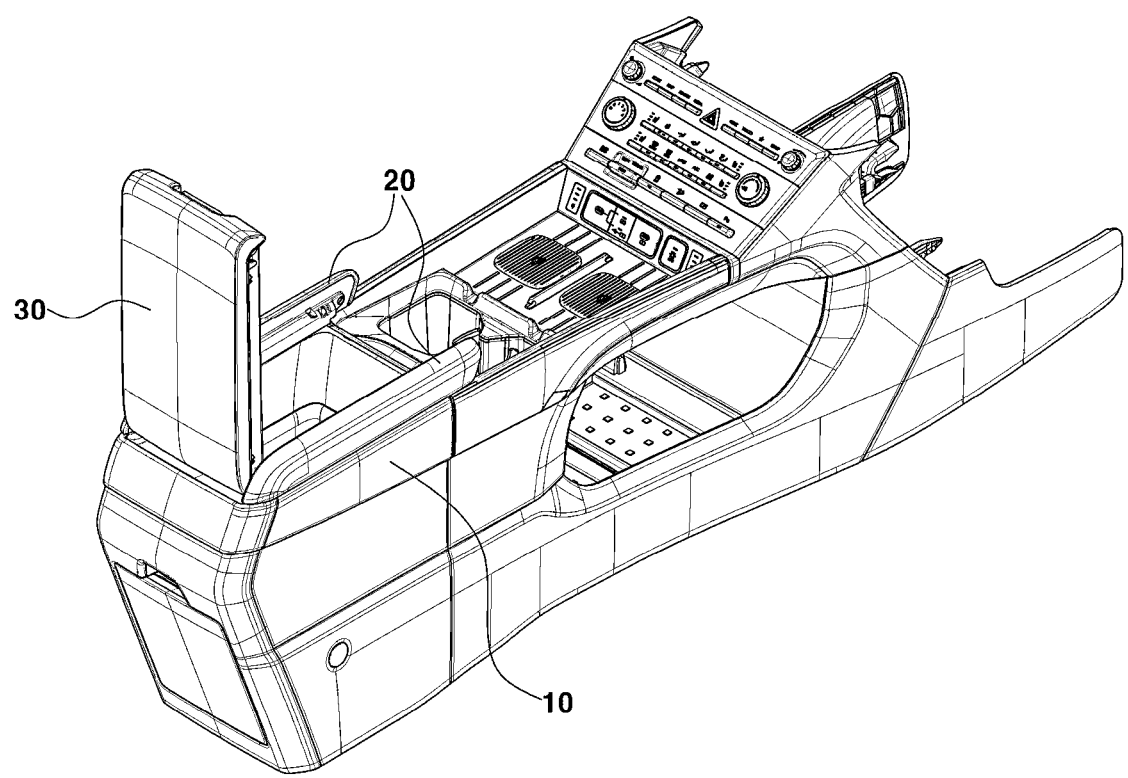
FIG. 1A illustrates a bidirectionally openable console in which a center lid portion is opened about the rear end thereof according to an embodiment of the present disclosure.

It should be understood that the appended drawings are not necessarily to scale, presenting a somewhat simplified representation of various features of the basic principles of the present disclosure. The specific design features of the present disclosure as disclosed herein, including, for example, specific dimensions, orientations, locations, and shapes, should be determined in part by the particular intended application and use environment.

In the figures, the reference numbers refer to the same or equivalent parts of the present disclosure throughout the several figures of the drawing.

DETAILED DESCRIPTION

Hereinafter, embodiments of the present disclosure are described in detail with reference to the accompanying drawings. The embodiments of the present disclosure may be modified into various forms, and the scope of the present disclosure should not be construed as being limited to the following embodiments. These embodiments are provided so that this disclosure will be thorough and complete, and will fully convey the scope of the disclosure to those having ordinary skill in the art.

The term "part", "unit" or "lid portion" means a unit for performing at least one function or action, and may be realized by hardware or a combination of hardware.

Furthermore, the term "unit" used in the specification means a pair of components, which are positioned at opposite ends of a center lid portion 30 and side lid portions 20 and are constructed so as to respectively correspond to a first button unit 110 and a second button unit 120 (collectively, "a button unit 100").

Furthermore, terms used in the specification are intended to merely explain a certain embodiment but are not intended to restrict the embodiment. As used in the specification, a singular form is intended to include the plural forms as well, unless the context clearly indicates otherwise.

Furthermore, although the terms "one end (front end)", "the other end (rear end)", etc. may be used herein to describe various similar elements, these elements should not be construed as being limited by these terms. These terms are only used to distinguish one element from another. When a component, device, element, or the like of the present disclosure is described as having a purpose or performing an operation, function, or the like, the component, device, or element should be considered herein as being "configured to" meet that purpose or to perform that operation or function.

Furthermore, the term "length direction" used in the specification may mean a longitudinal direction based on a vehicle or a console 10, and the term "width direction" used in the specification may mean a lateral direction based on the vehicle or the console 10. The length direction and the width direction are used to mean directions perpendicular to each other, and a center lid portion may be selectively openable about one of opposite ends thereof in the length direction or the width direction.

Furthermore, the length direction may mean a direction which extends longitudinally based on the center lid portion, and the width direction may mean a direction perpendicular to the length direction when viewed in a plan view.

Although the center lid portion is described in the specification as being opened at one end thereof about the other end thereof in the length direction, the center lid portion may also be construed as being opened about one end thereof in the width direction.

The present disclosure is directed to a bidirectionally openable console 10, in which the center lid portion 30 is openable in opposite directions based on the side lid portions 20 which are positioned at two lateral side surfaces of an upper portion of the console 10. In addition, the present disclosure is directed to a bidirectionally openable console 10, in which the center lid portion 30 is constructed so as to be rotatably openable about the front end or the rear end thereof.

Figure 1B:
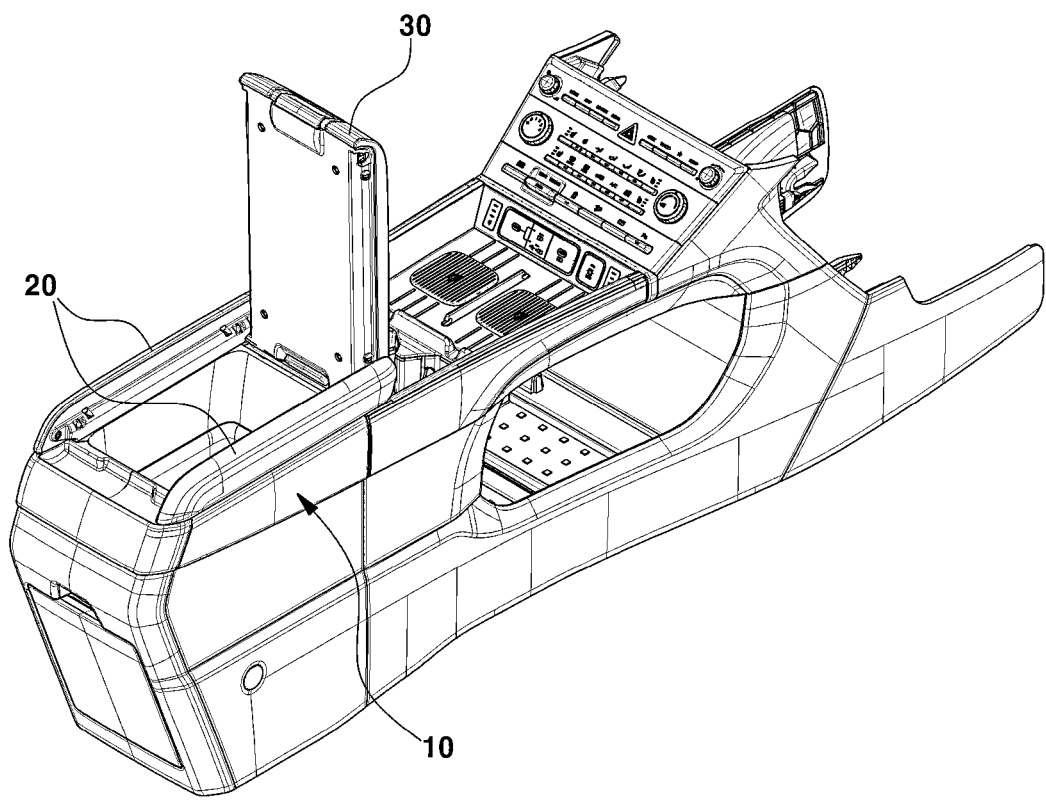
FIG. 1B illustrates the bidirectionally openable console in which the center lid portion is opened about the front end thereof according to an embodiment of the present disclosure.

FIG. 1A illustrates an embodiment of the present disclosure in which the center lid portion 30 is opened and developed about the rear end thereof in the length direction of the center lid portion 30. FIG. 1B illustrates the embodiment of the present disclosure in which the center lid portion 30 is opened and developed about the front end of the center lid portion 30.

In one embodiment, the console 10 may be positioned in the interior of a vehicle, and it may be constructed so as to have at least one partitioned storage space. The console 10 may be constructed such that the center lid portion 30, which is positioned at the upper surface of the console 10, is rotatably openable. The center lid portion 30 may be hingedly coupled at one end thereof to the side lid portions 20, which are positioned at two lateral sides of the storage space in the console 10, and the center lid portion 30 may be rotatably opened at the other end thereof.

According to an embodiment of the present disclosure, the console 10 may include a first button unit 110 and a second button unit 120, which are respectively positioned at opposite ends of the center lid portion 30 in the length direction. The first button unit 110 may be positioned at one end of the center lid portion 30 in the length direction, and the second button unit 120 may be positioned at the rear end of the center lid portion 30 in the length direction. The console 10 may include a rotary unit 200 configured to convert an input in the length direction into tension force in the width direction of the center lid portion 30, and a fastening unit 300. The fastening unit 300 is positioned in the center lid portion 30 and includes a central shaft portion 320 which selectively projects into the side lid portions 20.

The fastening unit 300 may include a central shaft portion 320, which is inserted into a hole portion formed in one of the side lid portions 20, and a fastening housing 310 configured to be movable together with the central shaft portion 320 in the width direction of the center lid portion 30. The fastening housing 310 may be integrally formed with a fastening holder 340. Consequently, when the central shaft portion 320 is moved, the fastening housing 310 may be moved together with the fastening holder 340.

In one embodiment, the console 10 may include a hinge unit 400 positioned close to the fastening unit 300. The hinge unit 400 may include a hole portion 410, which is provided in the side lid portion 20 close to the fastening unit 300 and into which the central shaft portion 320 is inserted and fixed, and a hinge nut 420 configured to define the hole portion 410 therein. The hinge unit 400 may further include a frictional guide 430, which is provided at a location at which the hinge nut 420 is fastened to the side lid portion 20. The hinge unit 420 may be coupled to the fastening guide 330 of the fastening unit 300 in a surface-to-surface fashion, and the hinge unit 420 may be rotated together with the center lid portion 30 upon rotation of the center lid portion 30. Accordingly, when the hinge nut 420 is rotated relative to the side lid portion 20, the frictional guide 430 may provide the hinge nut 420 with frictional force in order to prevent rapid rotation of the center lid portion 30.

When an opening request input is applied to the first button unit 110 or the second button unit 120, which is positioned at one of opposite ends of the center lid portion 30 in the length direction, the rotary unit 200, which is fastened to the first button unit 110 or the second button unit 120 to which the input is applied, may be rotated. At this time, the fastening unit 300, which is positioned close to the rotary unit 200, may be moved into the center lid portion 30.

Consequently, the fastening housing 310 and the central shaft portion 320 may be moved together into the center lid portion 30. The fastening holder 340, which is integrally formed with the fastening housing 310, may be moved together with the central shaft portion 320 in the direction of movement of the central shaft portion 320. At this time, the central shaft portion 320 may be separated from the hole portion in the side lid portion 20, and thus one end of the center lid portion 30 to which a button input is applied may become free in vertical movement. In another embodiment, the lower end of the fastening guide 330 is open such that the fastening guide 330 is freely movable over the hinge nut 420 in the vertical direction. Consequently, when the central shaft portion 320 is inserted into the center lid portion 30, the center lid portion 30 may be rotatable.

Meanwhile, because the central shaft portion 320, at the other end of the center lid portion 30 to which the button input is not applied, is maintained in the state of being fastened in the hole portion 410 in the side lid portion 20, the one end of the center lid portion 30 may be rotatably openable in the vertical direction about the central shaft portion 320.

When the one end of the center lid portion 30 is opened, the other end of the center lid portion 30 may be configured to prevent an input of the button unit.

A locking unit 500 may be provided at at least one of two lateral side surfaces of the center lid unit 30 which face the side lid portions 20. According to an embodiment of the present disclosure, the locking unit 500 may be positioned at each of the lateral sides of the center lid portion 30 close to the fastening unit 300. The locking unit 500 may be constructed so as to project in a direction toward the side lid portion 20. Accordingly, when the center lid portion 30 is closed, the locking unit 500 may be engaged with the side lid portion 20, and a locking rod 510 may be maintained in the state of being rotated about one end thereof which is fastened to the center lid portion 30. Meanwhile, when the center lid portion 30 is open, the locking rod 510 of the locking unit 500 may be rotated downwards at the other end thereof, which is engaged with the side lid portion 20, by means of an elastic member.

The locking unit 500 may be positioned close to the fastening holder 340. When the center lid portion 30 is open, the locking unit 500 may be engaged with the fastening holder 340, which is retracted into the center lid portion 30 together with the fastening housing 310, thereby supporting the fastening holder 340. Accordingly, the locking unit 500 may be positioned at one end of the center lid portion 30 to which an opening request input is applied such that the fastening unit 300 is maintained in the state of being inserted into the center lid portion 30. It is desired to maintain the state in which the fastening holder 340 and a locking protrusion 520 are engaged with each other and the fastening unit 300, which includes the central shaft portion 320, is inserted into the center lid portion.

When the center lid portion 30 is fastened between the side lid portions 20, the locking rod 510 may be brought into contact with the side lid portion 20 and may be rotated thereby, and the locking protrusion 520 positioned at the locking rod 510 may be rotated downwards in the vertical direction so as to be disengaged with the fastening holder 340. Consequently, the central shaft portion 320 of the center lid portion 30, which is positioned in the center lid portion 30, may be driven so as to be inserted into the side lid portion 20.

When an opening request input is applied through the button unit 100, which is positioned at one end of the center lid portion 30 in the length direction, the fastening holder 340, which is provided at the one end of the center lid portion 30 to which the opening request input is applied, may be engaged with the locking protrusion 520 of the locking unit 500, and the fastening housing 310 may be held in the center lid portion 30. At this point, the central shaft portion 320 may be inserted into the center lid portion 30, thereby releasing the engagement between the side lid portion 20 and the center lid portion 30. As a result, the one end of the center lid portion 30 to which the opening request input is applied may be rotatably opened about the central shaft portion 320 which is positioned at the other end of the center lid portion 30 to which the opening request input is not applied.

Figure 2:
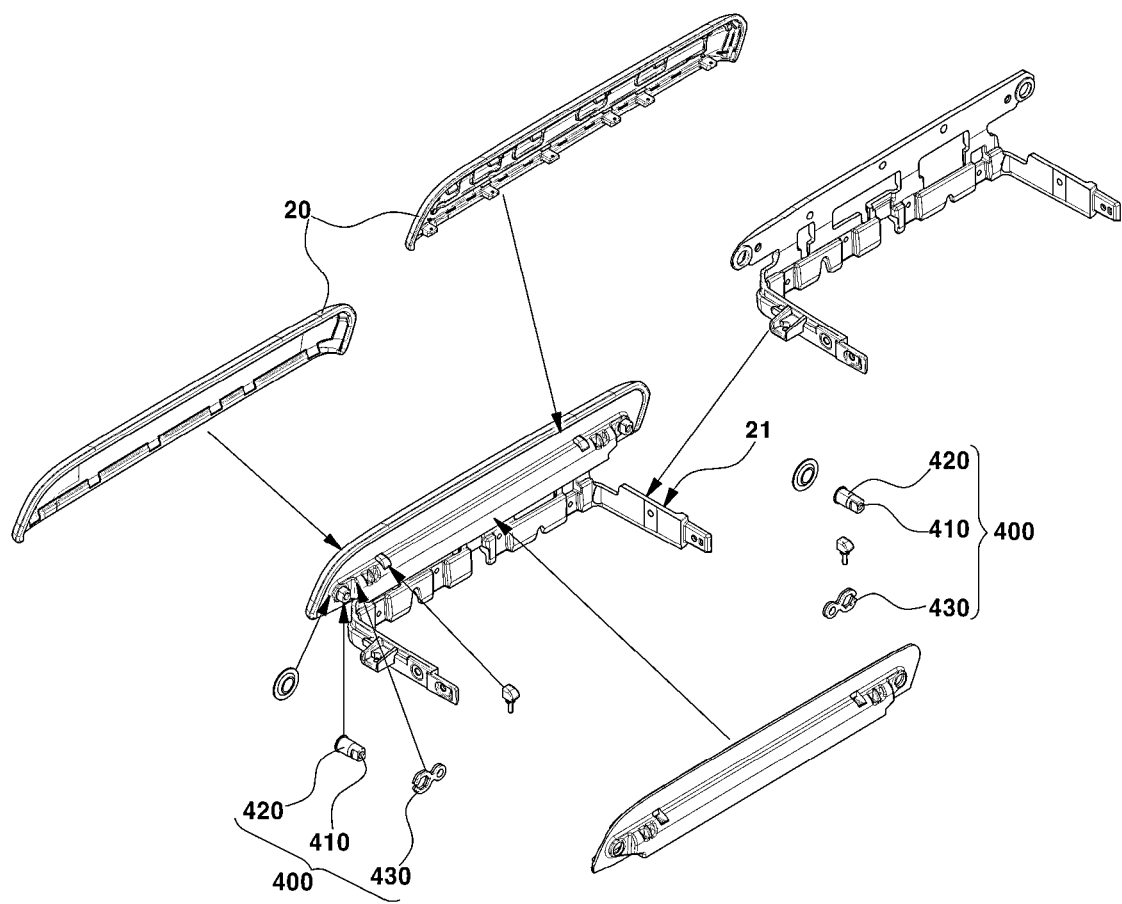
FIG. 2 illustrates the structure of a side lid portion according to an embodiment of the present disclosure.

FIG. 2 illustrates subcomponents of the side lid portion 20 according to an embodiment of the present disclosure.

As illustrated in the drawing, the console 10 according to an embodiment of the present disclosure may include the side lid portions 20, which are positioned at two lateral sides of the opening formed in the upper surface of the console 10. The side lid portion 20 may include the hole portions 410, which are positioned at opposite ends of the side lid portion 20 in the length direction and into which the central shaft portion 320 is inserted and held therein, and the hinge nuts 420, each configured to define the hole portion 410 therein, which is fixed to brackets 21 of the side lid portion 20. Each of the hinge nuts 420 may have at least two surfaces which face the center lid portion 30 and come into contact with the fastening guide 330 positioned at the center lid portion 30 in a surface-to-surface fashion. According to an embodiment of the present disclosure, the hinge nut 420 may be a hexagonal nut, and it may be in contact with the fastening guide 330 in a surface-to-surface fashion, which is open at the lower end thereof and has two lateral side surfaces which are parallel to each other.

The bracket 21 of the side lid portion 20 to which the hinge nut 420 is fastened may be provided with the frictional guide 430 which is positioned close to the rotating shaft of the hinge nut 420. The frictional guide 430 may be positioned in the state of being in contact with the outer surface of the hinge nut 420 and may exert frictional force in the direction opposite the direction of rotation of the hinge nut 420 upon rotation of the hinge nut 420. Consequently, even when the hinge nut 420 is rotated together with the center lid portion 30, it is possible to prevent rapid rotation of the hinge nut 420.

Accordingly, when one end of the center lid portion 30 in which the central shaft portion 320 is released is moved in an upward direction of the console 10, the center lid portion 30 may be rotated about the other end thereof in which the central shaft portion 320 is not released. At this time, the hole portion 410 and the hinge nut 420, which are positioned at the other end of the center lid portion 30 and include the rotating shaft, may be rotated together with the center lid portion 30. Here, the hinge nut 420 constituting the rotating shaft may be provided with a frictional force, which is generated by the frictional guide 430, in order to the limit rotational speed of the center lid portion 30.

Figure 3:
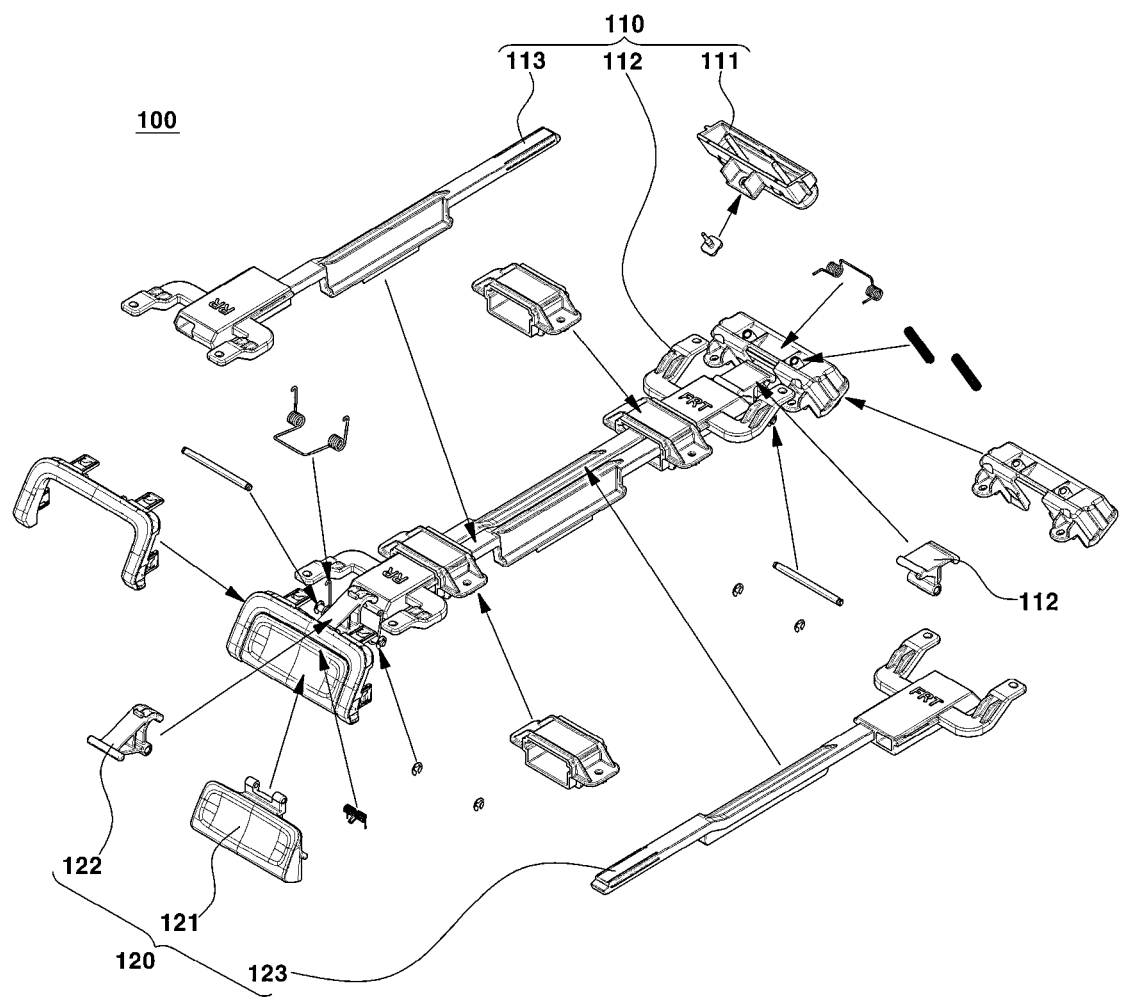
FIG. 3 illustrates subcomponents of a button unit of the center lid portion according to an embodiment of the present disclosure.

FIG. 3 illustrates the components of a button unit 100 positioned in the center lid portion 30.

As illustrated in the drawing, the first button unit 110 may be positioned at one end of the center lid portion 30, and the second button unit 120 may positioned at the other end of the center lid portion 30. In response to an opening request input through the first button unit 110 or the second button unit 120, the rotary unit 200 may be rotated in the width direction of the center lid portion 30. The end of the rotary unit 200 may be coupled to the fastening unit 300, and thus the fastening unit 300 may be moved in the width direction of the center lid portion 30 in response to rotation of the rotary unit 200. In one embodiment, the first button unit 110 may include a first button portion 111, which is positioned on the outer surface of the center lid portion 30, a first rotating portion 112 coupled to an inner end of the center lid portion 30, and a first button rod 113. The first button rod 113 is connected to an inner end of the first rotating portion 112 and is positioned close to a second rotating portion 122 of the second button unit 120. In one embodiment, the first button rod 113 may extend in the length direction of the center lid portion 30 between the first rotating portion 112 and the second rotating portion 122, and the first button rod 113 may be moved to a position close to the second rotating portion 122 in response to rearward rotation of the first rotating portion 112. Consequently, when the first button rod 113 is moved in the length direction of the center lid portion 30, rotation of the second rotating portion 122 may be restricted.

The second button unit 120 may include a second button portion 121, which is positioned at the center lid portion 30, and the second rotating portion 122, which is positioned at the inner end of the second button portion 121. Furthermore, the second button unit 120 may include a second button rod 123, which is positioned close to the second rotating portion 122 and extends to a region close to the first rotating portion 112. When an opening request input is applied to the second button portion 121, the second button rod 123 may be moved to a position close to the first rotating portion 112 in the length direction of the center lid portion 30 in response to rearward rotation of the second rotating portion 122. Consequently, when an opening request input is applied to the second button portion 121, operation of the first button unit 110 may be restricted.

According to an embodiment of the present disclosure, the first button portion 111 may be constructed so as to be pushed in the length direction of the center lid portion 30, and the second button portion 121 may be constructed so as to be sloped to a predetermined angle and to be pushed into the center lid portion 30. The first button rod 113 and the second button rod 123 may be positioned adjacent to each other in the center lid portion 30.

Figure 4:
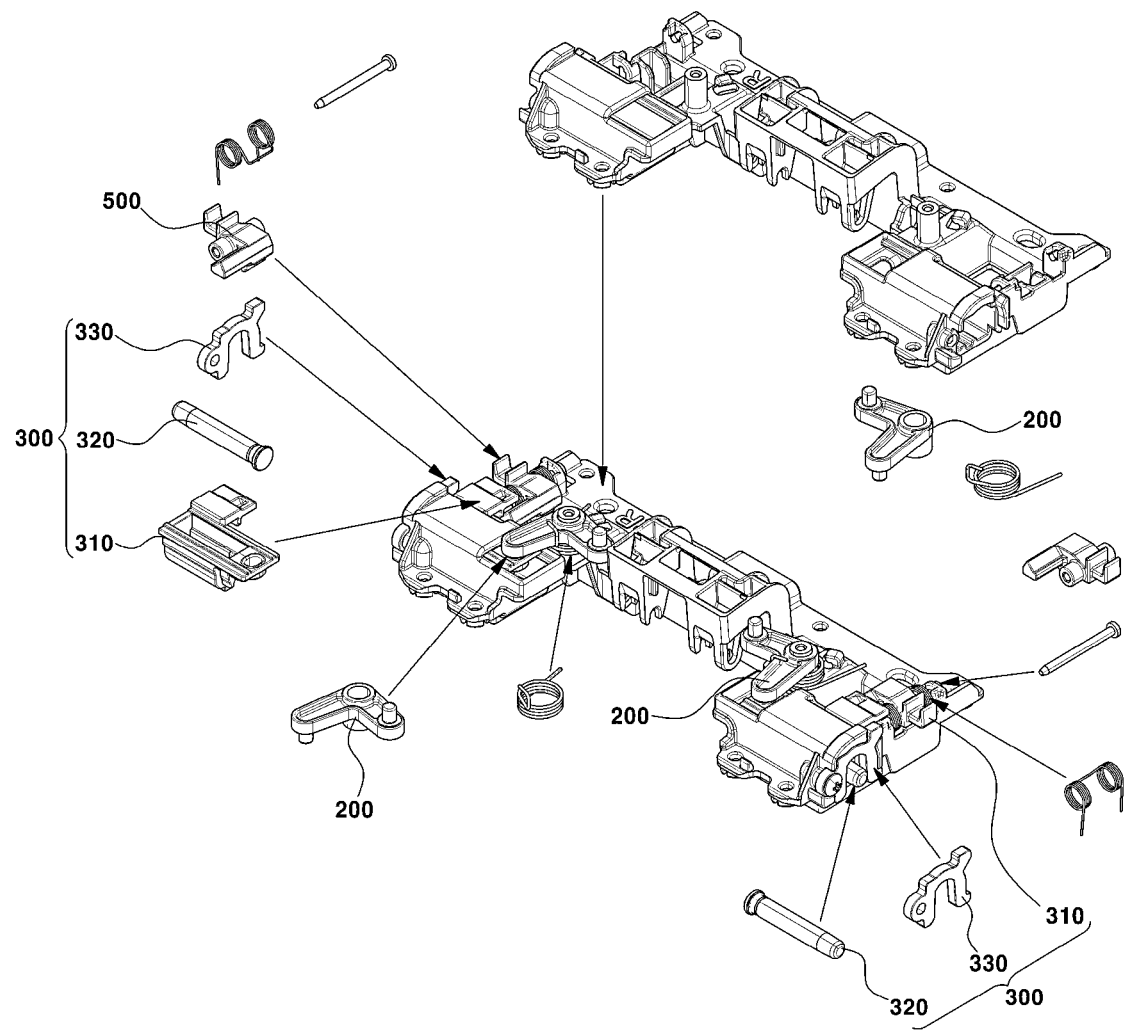
FIG. 4 illustrates coupling relationships between the components of a fastening unit including a central shaft portion according to an embodiment of the present disclosure.

FIG. 4 illustrates the fastening unit 300, which is positioned in the center lid portion 30 and includes the central shaft portion 320.

The rotary unit 200 may be positioned at each of opposite ends of the center lid portion 30 close to the button unit 100. When the button unit 100 is pushed in the length direction of the center lid portion 30, the rotary unit 200 may be rotated, and thus the fastening unit 300 may be moved in the width direction of the center lid portion 30.

The fastening unit 300 may include the central shaft portion 320, which is selectively inserted into the hole portion 410 positioned at the side lid portion 20. Furthermore, the fastening unit 300 may include the fastening housing 310, which is coupled to one end of the rotary unit 200 and is moved together with the central shaft portion 320. The fastening housing 310 may be integrally formed with the fastening holder 340, and the fastening holder 340 may be moved in the width direction of the center lid portion 30 together with the fastening housing 310.

The fastening holder 340 may be positioned close to the locking unit 500. The fastening holder 340 and the locking protrusion 520 of the locking rod 510 may be selectively engaged with each other depending on vertical movement of the locking rod 510.

In an embodiment of the present disclosure, the locking unit 500 may include the locking rod 510 and the locking protrusion 520 integrally formed with the locking rod 510. The locking rod 510 may be rotated in the vertical direction about a point in the center lid portion 30. When the center lid portion 30 is closed, the portion of the locking rod 510 that projects outwards from the center lid portion 30 may be in contact with the side lid portion 20 at at least a portion thereof, and one end of the locking rod 510 which is in contact with the side lid portion 20 may be rotated upwards in the vertical direction about the rotating shaft in the center lid portion 30.

When the center lid portion 30 is opened, the fastening holder 340 may be moved inwards in the width direction of the center lid portion 30 together with the central shaft portion 320, and one end of the locking rod 510 may be separated from the side lid portion 20 and may be rotated downwards. Consequently, the lower end of the fastening holder 340 and the locking protrusion 520 formed on the upper end of the locking rod 510 may be engaged with each other. Because the locking protrusion 520 is engaged with the fastening holder 340 when the fastening holder 340 is retracted into the center lid portion 30, the fastening holder 340, the fastening housing 310, and the central shaft portion 320 may be maintained in the state of being retracted into the center lid portion 30.

Accordingly, when one end of the center lid portion 30 to which an opening request input is applied is open, the central shaft portion 320 may be maintained in the state of being retracted into the center lid portion 30 by virtue of the engagement between the locking protrusion 520 of the locking rod 510 and the fastening holder 340.

Figure 5A:
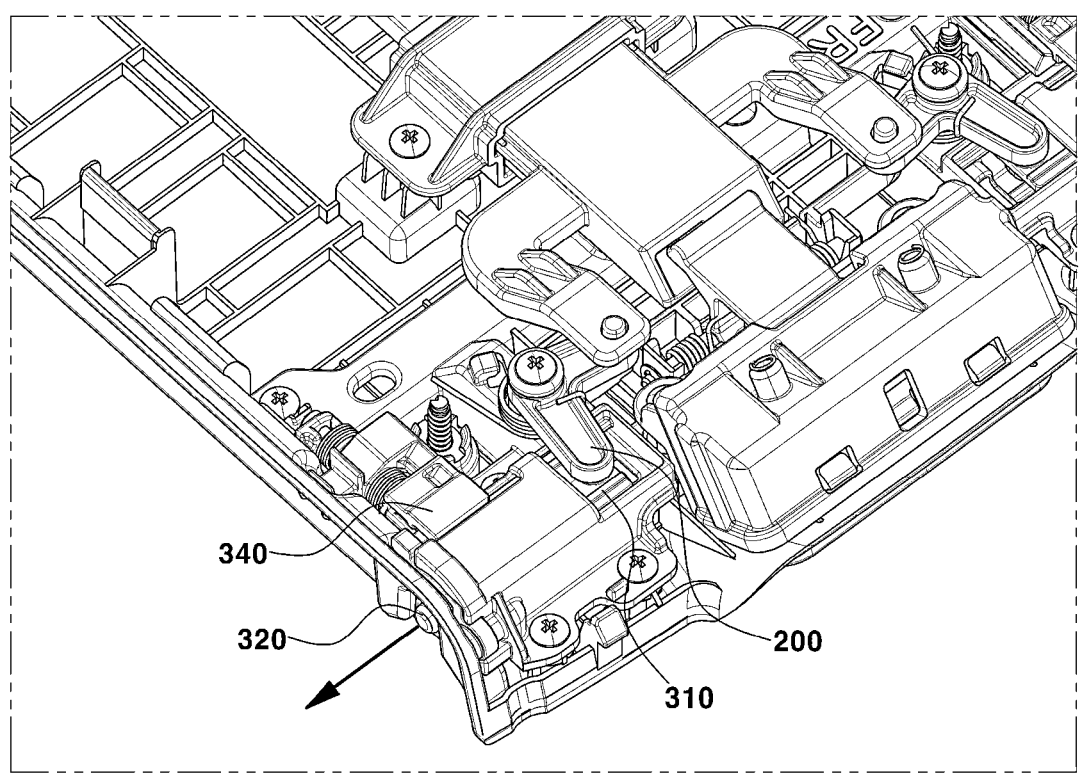
FIG. 5A illustrates the assembled state of the fastening unit in which the central shaft portion projects according to an embodiment of the present disclosure.
Figure 5B:
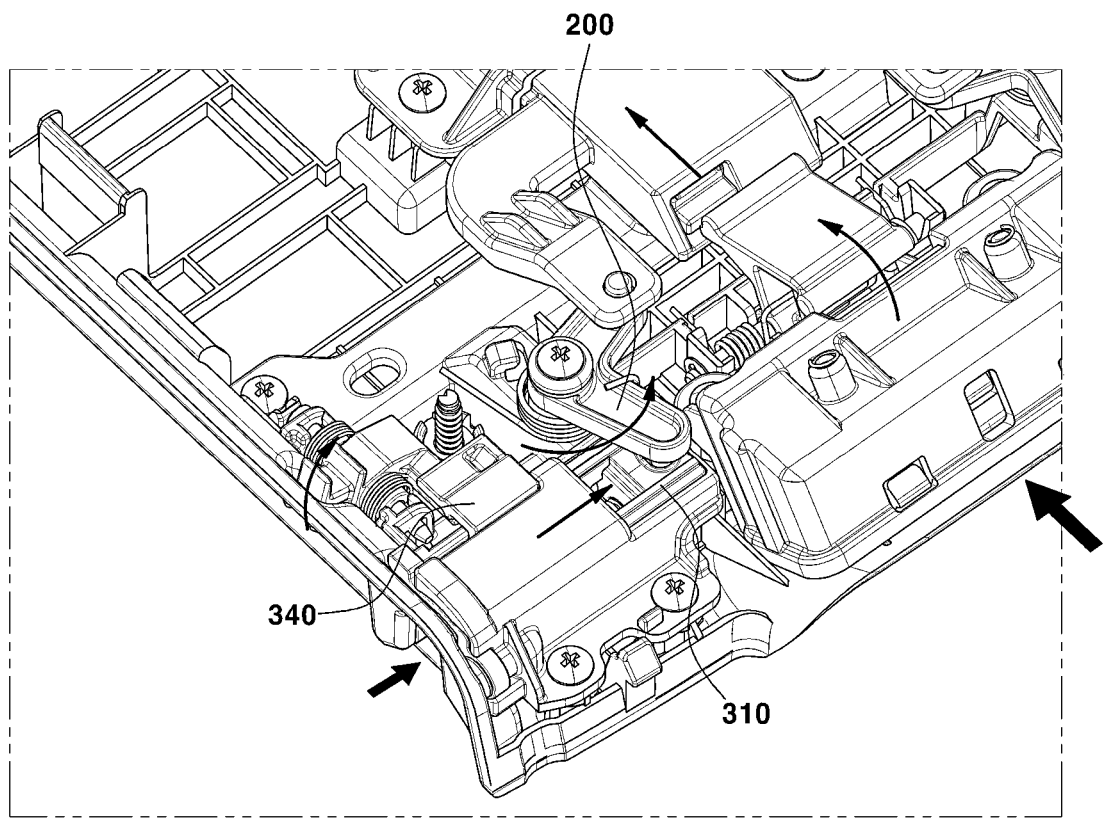
FIG. 5B illustrates the assembled state of the fastening unit in which the central shaft portion is retracted according to an embodiment of the present disclosure.

FIG. 5A illustrates the central shaft portion 320 which projects outwards from the center lid portion 30 when the center lid portion 30 is closed. FIG. 5B illustrates the state in which the central shaft portion 320 is retracted into the center lid portion 30 when an opening request input is applied to one end of the center lid portion 30.

As illustrated in FIG. 5A, when an opening request input is not applied to any one of opposite ends of the center lid portion 30, the central shaft portion 320 may be positioned close to each of the two lateral side surfaces of the center lid portion 30 together with the fastening housing 310 and the fastening holder 340. Here, because the elastic member provided at the rotary unit 200 biases the fastening unit 300 toward the outer surface of the center lid portion 30, the central shaft portion 320 may project outwards from the center lid portion 30 when an opening request input is not applied. At this point, because the central shaft portion 320 is disposed in the hole portion 410 of the side lid portion 20, the side lid portion 20 and the center lid portion 30 may be maintained in the state of being engaged with each other.

Meanwhile, when an opening request input is applied to the button unit 100 positioned at one end of the center lid portion 30, as illustrated in FIG. 5B, the button portion 111 or 121 may exert force in the length direction of the center lid portion 30 and may thus rotate the rotary unit 200 in response to the applied input. Because the rotary unit 200 is coupled to the fastening housing 310 of the fastening unit 300 and is moved therewith, the fastening housing 310 may be moved to the inside of the center lid portion 30 by virtue of the rotation of the rotary unit 200.

The fastening holder 340 and the central shaft portion 320, which are integrally formed with the fastening housing 310, may be simultaneously moved inwards in the width direction of the center lid portion 30. Consequently, the central shaft portion 320, which projects outwards from the center lid portion 30, may be retracted into the center lid portion 30, thereby releasing the engagement between the side lid portion 20 and the center lid portion 30. As a result, one end of the center lid portion 30 may be rotated upwards in the vertical direction about the other end of the center lid portion 30 at which the engagement between the side lid portion 20 and the center lid portion 30 is not released.

Figure 5D:
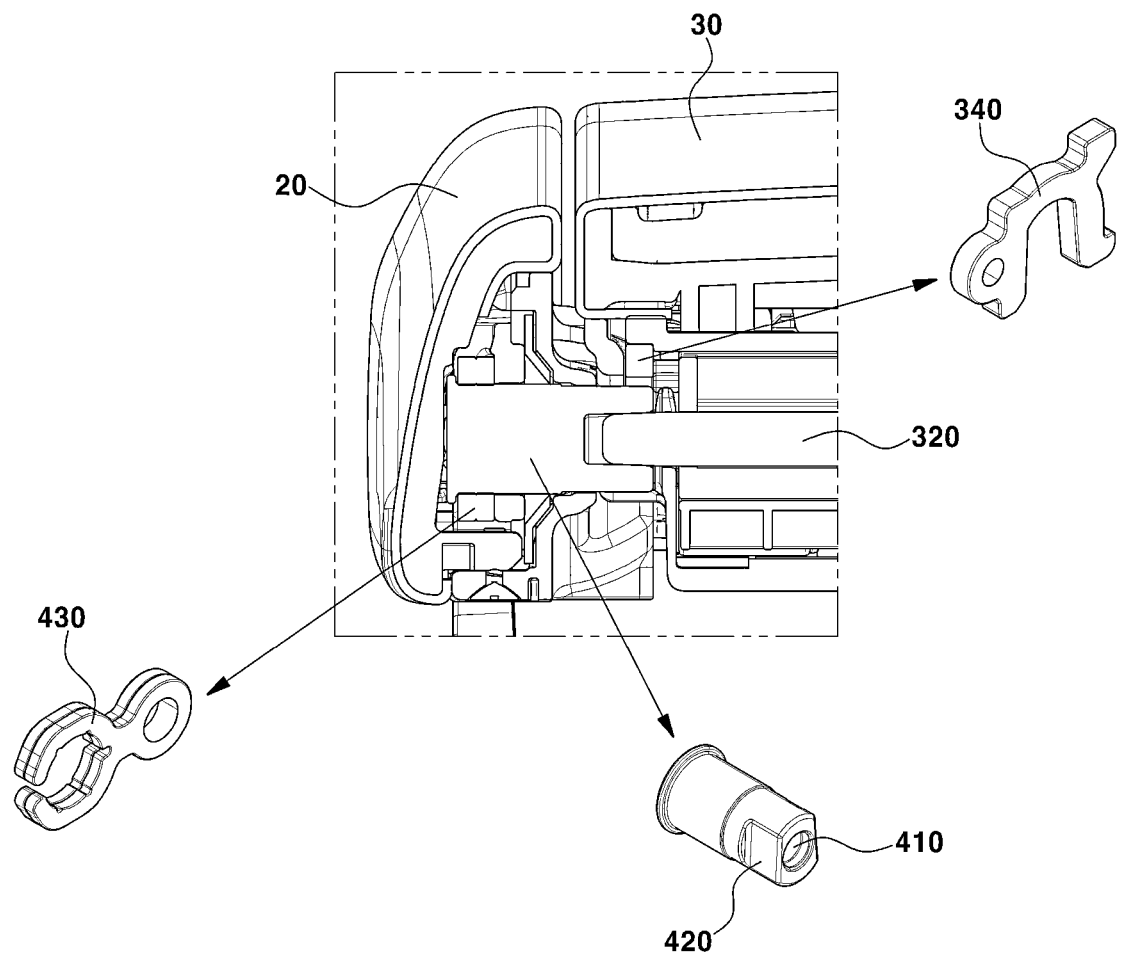
FIG. 5D is a front cross-sectional view of the hinge unit into which the central shaft portion is inserted, according to an embodiment of the present disclosure.

FIGS. 5C and 5D illustrate the structure of the hinge unit 400.

The hinge unit 400 may be positioned at the side lid portion 20 close to the central shaft portion 320. The hinge unit 400 may include the hole portion 410, into which the central shaft portion 320 is inserted, and the hinge nut 420, which is inserted into the fastening guide 330. The hinge nut 420 may be engaged with the fastening guide 330 having an open lower end such that the fastening guide 330 is coupled to the hinge nut 420 together with the center lid portion 30. In one form, the fastening guide 330 may be constructed such that the lower end thereof is open and the inner surfaces, which extend in the vertical direction, are parallel to each other, and the parallel surfaces formed on the outer surface of the hinge nut 420 may be inserted into the fastening guide 330.

In one embodiment, the hinge nut 420 may be fixed to the bracket 21 of the side lid portion 20, and the hinge nut 420 may be rotated together with the center lid portion 30 about the fixed point. The hinge unit 400 may further include the frictional guide 430, which is fixed to the bracket 21 to which the hinge nut 420 is coupled. The frictional guide 430 provides the hinge nut 420 with frictional force corresponding to the rotative force of the hinge nut 420. The frictional guide 430 may be fixed to the bracket 21 and may be positioned on the outer surface of the hinge nut 420, which is rotated at a position close to the rotating shaft of the hinge nut 420. Accordingly, when the hinge nut 420 is rotated together with the center lid portion 30, the hinge nut 420 may have the same central axis as the axis of the central shaft portion 320, and the frictional guide 430 may exert frictional force upon the hinge nut 420 in order to prevent rapid rotation of the center lid portion 30.

Figure 6A:
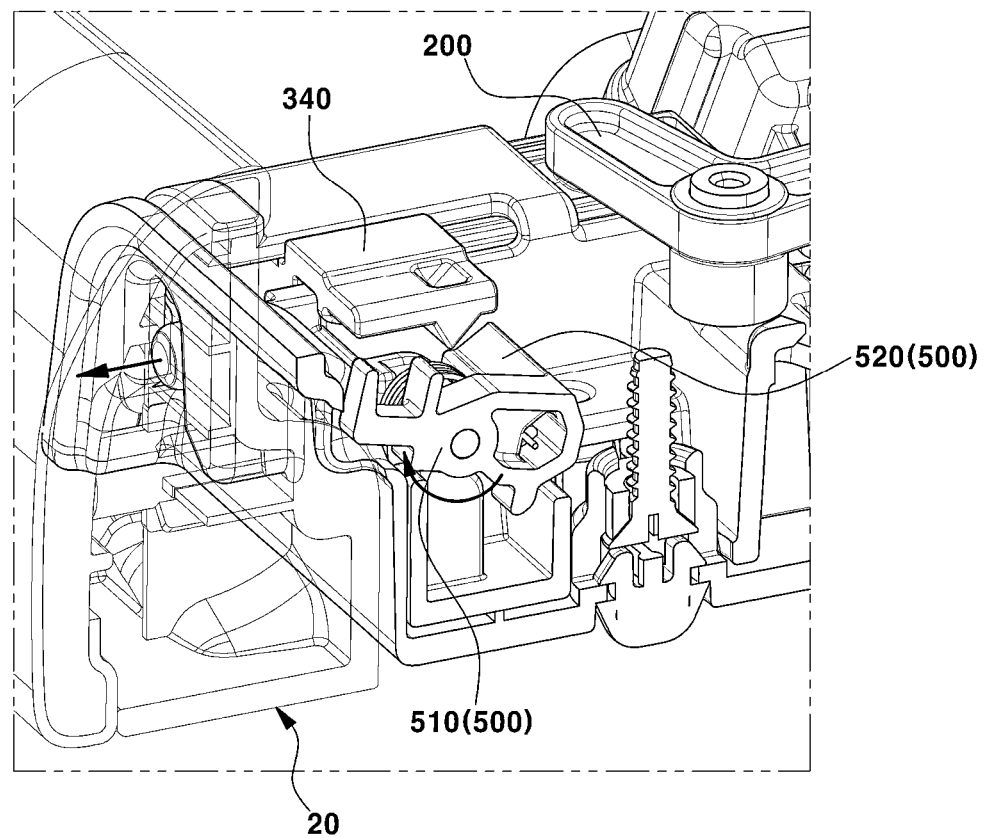
FIG. 6A illustrates structural relationships of a locking unit when the center lid portion is closed, according to an embodiment of the present disclosure.
Figure 6B:
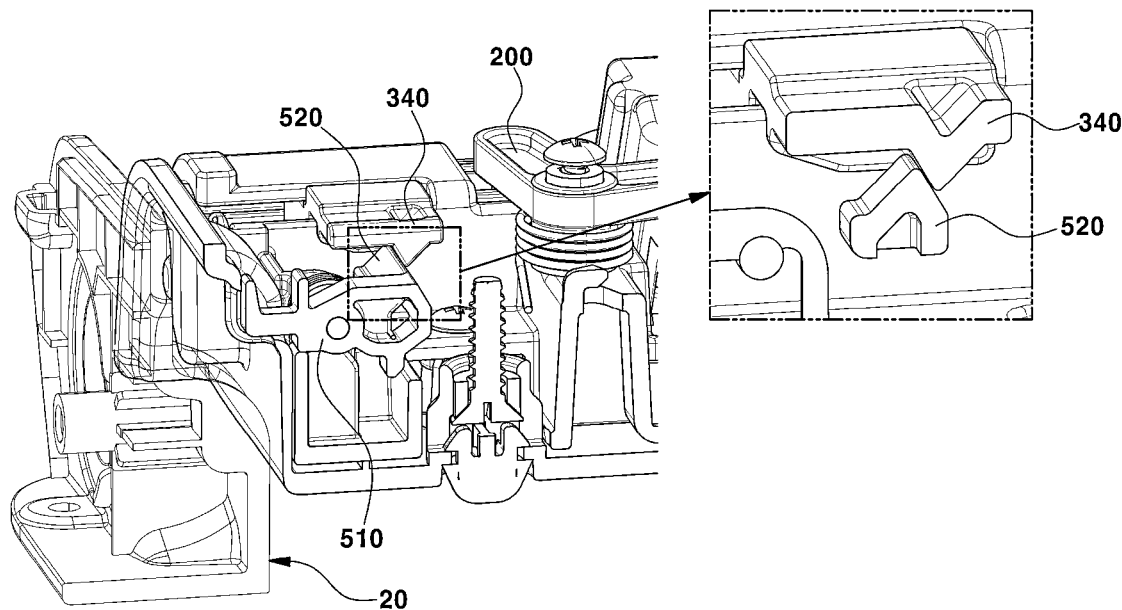
FIG. 6B illustrates structural relationships of the locking unit when the center lid portion is open, according to an embodiment of the present disclosure.

FIG. 6A illustrates the coupling relationships between the fastening holder 340 and the locking unit 500 when the center lid portion 30 is closed. FIG. 6B illustrates the coupling relationships between the fastening holder 340 and the locking unit 500 when the center lid portion 30 is open.

As illustrated in FIG. 6A, the end of the locking rod 510 of the locking unit 500 may project outwards from the center lid portion 30 and may be in contact with the side lid portion 20. In one embodiment, the locking rod 510, which projects outwards from the center lid portion 30, may be rotated about the rotating shaft in the center lid portion 30. The end of the locking rod 510, which projects and contacts the side lid portion 20, may be rotated upwards in the vertical direction and may introduced into the center lid portion 30.

The other end of the locking rod 510 may be provided with the locking protrusion 520 which is positioned so as to face the fastening holder 340. The locking protrusion 520 may be configured to be sloped toward the fastening holder 340. In one form, the locking protrusion 520 may have a cross-sectional area which decreases in an upward direction.

Accordingly, when the center lid portion 30 is closed, the locking rod 510 may be positioned in the state of being rotated to a predetermined angle, and the other end of the locking rod 510 at which the locking protrusion 520 is positioned may be rotated downwards and may be maintained in the state of being spaced apart from the fastening holder 340.

Meanwhile, when the center lid portion 30 is open, as illustrated in FIG. 6B, the fastening holder 340 may be moved to the inside of the center lid portion 30 together with the fastening housing 310, and the outer end of the locking rod 510 may be rotated downwards and be spaced apart from the side lid portion 20. Consequently, the other end of the locking rod 510 including the locking protrusion 520 may be rotated upwards, and may be brought into contact with the outer surface of the fastening holder 340 which has been moved inwards in the width direction of the center lid portion 30.

Specifically, the fastening holder 340, which is moved in an inward direction of the center lid portion 30, may come into contact with the locking protrusion 520, which is positioned at the inner end of the locking rod 510, thereby restricting movement of the fastening holder 340 in the width direction while the center lid portion 30 is open. Consequently, the fastening housing 310 including the central shaft portion 320 may be maintained in the retracted state.

When the center lid portion 30 is closed again, one end of the locking rod 510, which projects and is in contact with the side lid portion 20, may be rotated upwards, and the other end of the locking rod 510 at which the locking protrusion 520 is positioned may be rotated downwards and may thus be spaced apart from the fastening holder 340. Consequently, by virtue of the elastic member positioned at the rotary unit 200 or the fastening unit 300, the fastening unit 300 may be restored such that the central shaft portion 320 projects outwards from the center lid portion 30.

In summary, when an opening request input is applied to one end of the center lid portion 30, the central lid portion, which is positioned at the one end of the center lid portion 30, may be retracted into the center lid portion 30, and the locking protrusion 520 may be engaged with the fastening holder 340, thereby maintaining the retracted state of the central shaft portion 320.

Figure 7A:
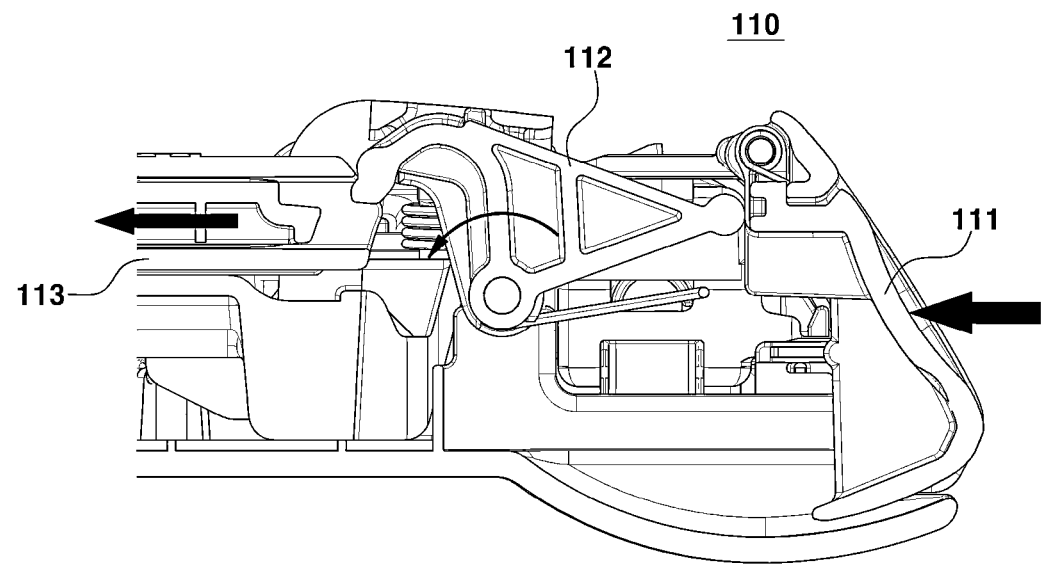
FIG. 7A illustrates coupling relationships of a first button unit according to an embodiment of the present disclosure.

FIG. 7A illustrates one end of the center lid portion 30 at which the first button unit 110 is positioned.

In the first button unit 100, the first button portion 111, which is rotatably moved in the length direction of the center lid portion 30, may be positioned at one end of the center lid portion 30 so as to be exposed. The first button unit 110 may include the first rotating portion 112, which is rotated in the forward/backward direction about the central shaft which is oriented in the width direction of the center lid portion 30. One end of the first rotating portion 112 may be connected to the first button portion 111 such that the first rotating portion 112 is rotated by movement of the first button portion 111 in the length direction of the center lid portion 30. The first button rod 113 may be positioned in the first rotating portion 112, and may extend to a location close to the second button unit 120 in the length direction of the center lid portion 30.

Consequently, when an opening request input is applied to the first button portion 111, the first button portion 111 may be moved in the length direction of the center lid portion 30, and the first rotating portion 112 connected to the first button portion 111 may be rotated to the inside of the center lid portion 30 about the central shaft thereof. At this time, the first button rod 113 may be moved toward the second button unit 120 by the pushing force applied by the first rotating portion 112. In one embodiment, when an opening request input is applied to the first button portion 111, the other end of the first button rod 113 may be moved to a position at which the other end interferes with the second rotating portion 122, thereby restricting operation of the second button unit 120.

Figure 7B:
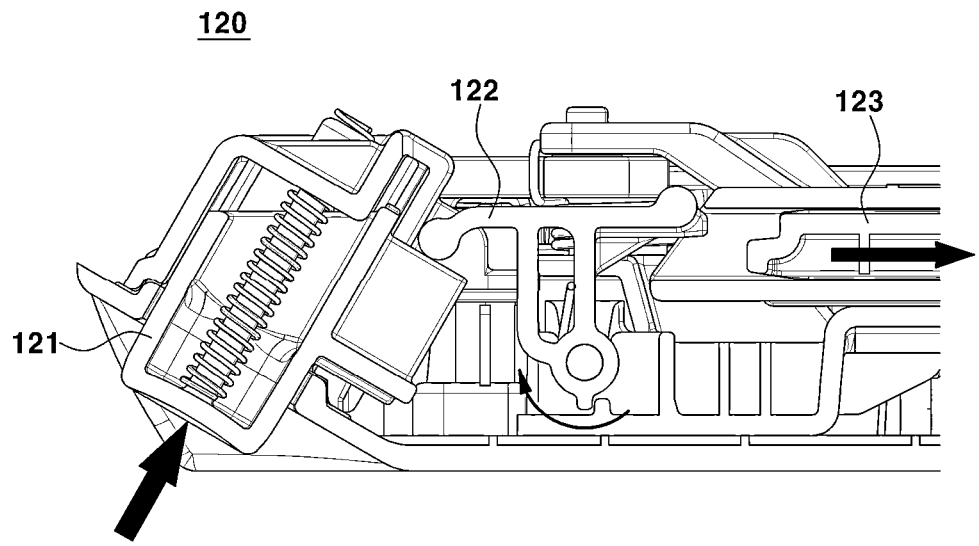
FIG. 7B illustrates coupling relationships of a second button unit according to an embodiment of the present disclosure.

FIG. 7B illustrates the cross-section of the other end of the center lid portion 30 at which the second button unit 120 is positioned.

The second button unit 120 may include the second button portion 121, which is positioned at the other end of the center lid portion 30 so as to be exposed, the second rotating portion 122, which is provided in the second button portion 121 and is rotatable about the central shaft which extends in the width direction of the center lid portion 30, and the second button rod 123, which is positioned in the second rotating portion 122 and extends to the first button unit 110 in the length direction of the center lid portion 30.

The second button portion 121 may receive an input for opening of the other end of the center lid portion 30 by pressure in an oblique direction. At this time, the second button portion 121 may be moved to a predetermined position in the length direction of the center lid portion 30, and the second rotating portion 122 connected to the second button portion 121 may be rotatably moved rearwards about the central shaft which extends in the width direction of the center lid portion 30. The second button rod 123 may be moved to a location close to the first button unit 110 by the movement of the second rotating portion 122, thereby restricting operation of the first button unit 110. Because the second button rod 123 is moved to a location close to the first rotating portion 112, the second button rod 123 may restrict operation of the first rotating portion 112 while the opening request input is applied to the second button portion 121.

Figure 8A:
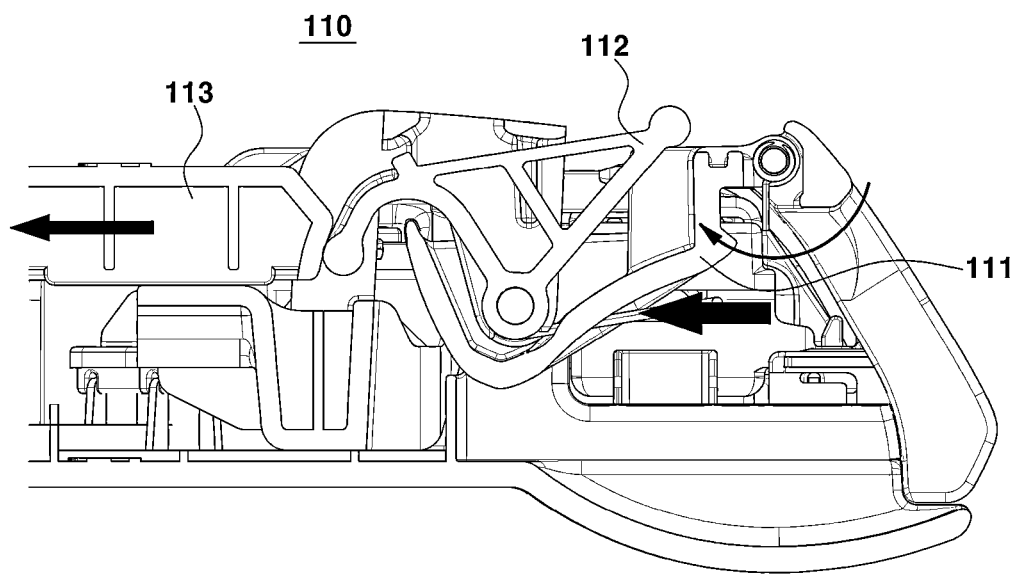
FIG. 8A illustrates operational relationships by input movement of the first button unit according to an embodiment of the present disclosure.
Figure 8B:
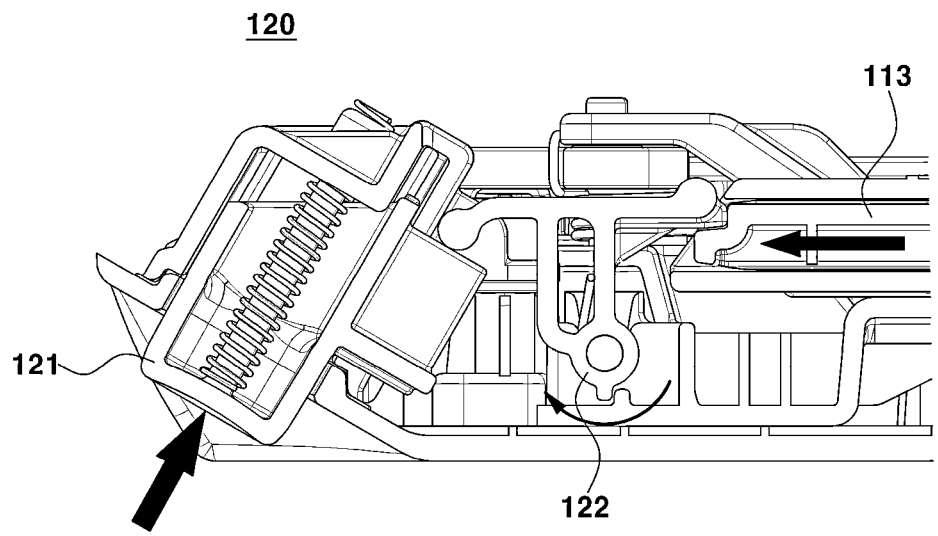
FIG. 8B illustrates coupling relationships of the second button unit by input movement of the first button unit according to an embodiment of the present disclosure.

FIGS. 8A and 8B illustrate the state in which the first button rod 113 is moved to a location at which the first button rod 113 interferes with operation of the second rotating portion 122 when an opening request input is applied to the first button unit 110.

As illustrated in the drawings, when an input for opening of one end of the center lid portion 30 is applied to the first button portion 111, the first rotating portion 112 may be rotatably moved rearwards about the central shaft which extends in the width direction of the center lid portion 30. Here, the first button rod 113 may be moved toward the end of the center lid portion 30 which is remote from the first button portion 111 in the length direction of the center lid portion 30, and the other end of the first button rod 113 may be positioned in the range of the radius of rotation of the second rotating portion 122.

Specifically, as illustrated in FIG. 8B, the end of the first button rod 113 may be moved to a location close to the second rotating portion 122, thereby restricting an opening request input though the second button portion 121.

One end of each of the first button rod 113 and the second button rod 123 may be constructed such that upper and lower portions of the end based on the center line in the vertical direction are sloped. Accordingly, when a maximum opening input is applied through the first button portion 111, the inner end of the first rotating portion 112 may be engaged with the lower slope portion and may be held thereby. Meanwhile, when a maximum opening input is applied through the second button portion 121, the second rotating portion 122 may be engaged with the lower slope portion of the end of the second button rod 123.

In other words, when an opening request input is applied to one of the first button portion 111 and the second button portion 121, one of the first button rod 113 and the second button rod 123, which is associated with the button portion to which the opening request input is applied, may be moved so as to restrict operation of one of the first and second button units 110 and 120, which is positioned at the opposite end and to which the opening request input is not applied. Furthermore, one of the first and second rotating portions 112 and 122 to which the opening request input is applied may be engaged with a corresponding one of the first and second button rods 113 and 123, thereby maintaining the open state of the one end of the center lid portion 30 to which the opening request input is applied.

By virtue of the above-described construction of the embodiment of the present disclosure, the present disclosure offers the following effects.

The present disclosure offers an effect of providing a center lid portion capable of being selectively openable in a forward or backward direction so as to allow access by both front and rear passengers.

Furthermore, the present disclosure offers an effect of providing a console which is constructed such that, when one end of a center lid portion is open, a fastening unit of the other end of the center lid portion is maintained in the fastened state so as to prevent separation of the center lid portion from side lid portions and thus to assure stable opening operation of the console.

The present disclosure has been described in detail with reference to embodiments thereof. However, it should be appreciated by those having ordinary skill in the art that changes may be made in these embodiments without departing from the principles and spirit of the present disclosure, the scope of which is defined in the appended claims and their equivalents.

Reference numerals set forth in the Drawings includes reference to the following elements as further discussed below:

| | |
|---|---|
| 10: Console | 20: Side lid portion |
| 21: Bracket | 30: Center lid portion |
| 100: Button unit | 110: First button unit |

-continued

| | |
|---|---|
| 111: First button portion | 112: First rotating portion |
| 113: First button rod | 120: Second button unit |
| 121: Second button portion | 122: Second rotating portion |
| 123: Second button rod | 200: Rotary unit |
| 300: Fastening unit | 310: Fastening housing |
| 320: Central shaft portion | 330: Fastening guide |
| 340: Fastening holder | 400: Hinge unit |
| 410: Hole portion | 420: Hinge nut |
| 430: Frictional guide | 500: Locking unit |
| 510: Locking rod | 520: Locking protrusion |

What is claimed is:

1. A bidirectionally openable console comprising:
   side lid portions positioned at two lateral sides of the console;
   a center lid portion positioned between the side lid portions and configured to be opened about any one of two ends thereof;
   a first button unit positioned at a front end of the center lid portion;
   a second button unit positioned at a rear end of the center lid portion;
   rotary units positioned at the center lid portion and configured to respectively rotate in response to opening request inputs applied to the first and second button units;
   fastening units positioned at two ends of the center lid portion, each of the fastening units including a central shaft portion, wherein when an opening request input is applied to a corresponding one of the first and second button units, a corresponding one of the rotary units is rotated so as to retract the central shaft portion of the fastening unit, which projects into the side lid portion, into the center lid portion;
   hinge units, each of which surrounds a corresponding one of the central shaft portions and is rotated together with the center lid portion when the center lid portion is opened; and
   locking units positioned adjacent to the fastening units, each of the locking units being brought into contact with the side lid portion at least a portion thereof and being configured to restrict movement of the fastening unit when the center lid portion is closed.

2. The bidirectionally openable console of claim 1, wherein each of the fastening units comprises:
   a fastening housing configured to be movable toward the side lid portion together with the central shaft portion;
   a fastening holder configured to be movable together with the fastening housing and positioned close to the locking unit; and
   a fastening guide configured to surround a portion of the center lid portion through which the central shaft portion projects.

3. The bidirectionally openable console of claim 2, wherein each of the hinge units comprises:
   a hole portion, which is positioned at the side lid portion and into which the central shaft portion is inserted;
   a hinge nut defining the hole portion, the hinge nut being engaged with the fastening guide and being rotated together with the center lid portion; and
   a frictional guide provided at a location at which the hinge nut faces the side lid portion, the frictional guide being configured to provide the hinge nut with frictional force when the hinge nut is rotated,
   wherein the hinge nut is inserted into the fastening guide so as to be coupled thereto in a surface-to-surface fashion.

4. The bidirectionally openable console of claim 2, wherein each of the locking units comprises:
   a locking rod configured to project at a portion thereof from the center lid portion so as to be in contact with the side lid portion; and
   a locking protrusion, which is provided at the locking rod and is engaged with the fastening holder.

5. The bidirectionally openable console of claim 4, wherein, when the center lid portion is closed, a portion of the locking rod is in contact with the side lid portion and the locking protrusion and the fastening holder are maintained in a state of being space apart from each other, and
   wherein when the center lid portion is open, the fastening holder is moved inwards beyond the locking protrusion and is engaged with the locking protrusion.

6. The bidirectionally openable console of claim 4, wherein the locking protrusion is sloped at a region thereof that faces the fastening holder.

7. The bidirectionally openable console of claim 1, wherein the first button unit comprises:
   a first button portion positioned at the front end of the center lid portion and configured to be inserted into the center lid portion in a length direction of the center lid portion;
   a first rotating portion configured to be in contact with an inner side of the first button portion and configured to be rotated in a vertical direction by movement of the first button portion in the length direction; and
   a first button rod configured to be moved to a location adjacent to the second button unit in the length direction of the center lid portion by rotation of the first rotating portion.

8. The bidirectionally openable console of claim 7, wherein the second button unit comprises:
   a second button portion positioned at the rear end of the center lid portion and configured to provide force in the length direction of the center lid portion;
   a second rotating portion configured to be in contact with the second button portion and rotated by movement of the second button portion; and
   a second button rod configured to be moved to a location adjacent to the first rotating portion in the length direction of the center lid portion by rotation of the second rotating portion so as to restrict rotation of the first rotating portion.

9. The bidirectionally openable console of claim 7, wherein when a pressure equal to or higher than a predetermined pressure is applied to the first button portion, one end of the first rotating portion is inserted into the first button rod and is held thereby.

10. A bidirectionally openable console comprising:
    side lid portions positioned at two lateral sides of the console;
    a center lid portion positioned between the side lid portions and configured to be opened about any one of two ends thereof;
    a first button unit positioned at a front end of the center lid portion;
    a second button unit positioned at a rear end of the center lid portion;
    fastening units positioned at two ends of the center lid portion, each of the fastening units being constructed such that, when an opening request input is applied to a corresponding one of the first and second button units, a central shaft portion of the fastening units, which projects into the side lid portion, is retracted into the center lid portion;

hinge units, each of which surrounds a corresponding one of the central shaft portions and is rotated together with the center lid portion when the center lid portion is opened; and locking units positioned adjacent to the fastening units of the center lid portion, each of the locking units being brought into contact with the side lid portion at at least a portion thereof and being configured to restrict movement of the fastening unit when the center lid portion is closed.

11. The bidirectionally openable console of claim 10, further comprising rotary units positioned at the center lid portion and configured to be respectively rotated so as to move the fastening units in a width direction in response to opening request inputs applied to the first and second button units.

12. The bidirectionally openable console of claim 10, wherein each of the fastening units comprises:

a fastening housing configured to be movable toward the side lid portion together with the central shaft portion;

a fastening holder configured to be movable together with the fastening housing and positioned close to the locking unit; and a fastening guide configured to surround a portion of the center lid portion through which the central shaft portion projects.

13. The bidirectionally openable console of claim 12, wherein each of the hinge units comprises:

a hole portion, which is positioned at the side lid portion and into which the central shaft portion is inserted, the hole portion being rotated together with the central shaft portion;

a hinge nut defining the hole portion, the hinge nut configured to be engaged with the fastening guide and rotated together with the center lid portion; and a frictional guide provided at a location at which the hinge nut faces the side lid portion, the frictional guide configured to provide the hinge nut with frictional force when the hinge nut is rotated, wherein the hinge nut is inserted into the fastening guide so as to be coupled thereto in a surface-to-surface fashion.

14. The bidirectionally openable console of claim 12, wherein each of the locking units comprises:

a locking rod configured to project at a portion thereof from the center lid portion so as to be in contact with the side lid portion; and a locking protrusion provided at an inner side of the locking rod and configured to engage with the fastening holder.

15. The bidirectionally openable console of claim 14, wherein, when the center lid portion is closed, a portion of the locking rod is in contact with the side lid portion and the locking protrusion and the fastening holder are maintained in a state of being space apart from each other, and wherein, when the center lid portion is open, the fastening holder is moved inwards beyond the locking protrusion and is engaged with the locking protrusion.

\* \* \* \* \*